(12) United States Patent
Andersson et al.

(10) Patent No.: US 10,471,544 B2
(45) Date of Patent: Nov. 12, 2019

(54) METHODS FOR JOINING TWO BLANKS

(71) Applicants: GESTAMP HARDTECH AB, Luleå (SE); AUTOTECH ENGINEERING A.I.E., Amorebieta-Etxano (ES)

(72) Inventors: Håkan Andersson, Luleå (SE); Paul Janiak, Luleå (SE); Niklas Malmberg, Luleå (SE)

(73) Assignees: AUTOTECH ENGINEERING A.I.E., Amorebieta-Etxano (ES); GESTAMP HARDTECH AB, Luleå (SE)

( * ) Notice: Subject to any disclaimer, the term of this patent is extended or adjusted under 35 U.S.C. 154(b) by 264 days.

(21) Appl. No.: 15/308,348

(22) PCT Filed: May 8, 2015

(86) PCT No.: PCT/EP2015/060178
§ 371 (c)(1),
(2) Date: Nov. 1, 2016

(87) PCT Pub. No.: WO2015/169946
PCT Pub. Date: Nov. 12, 2015

(65) Prior Publication Data
US 2017/0080523 A1    Mar. 23, 2017

(30) Foreign Application Priority Data
May 9, 2014    (EP) .................... 14167675

(51) Int. Cl.
*B23K 26/348*        (2014.01)
*B23K 9/167*         (2006.01)
(Continued)

(52) U.S. Cl.
CPC ............ *B23K 26/348* (2015.10); *B23K 9/167* (2013.01); *B23K 9/173* (2013.01); *B23K 10/02* (2013.01);
(Continued)

(58) Field of Classification Search
CPC .... B23K 26/346; B23K 26/348; B23K 9/167; B23K 9/173; B23K 10/02; B23K 28/02;
(Continued)

(56) References Cited

U.S. PATENT DOCUMENTS 3,865,639 A    2/1975  Bellot et al.
4,546,230 A    10/1985 Sasaki et al.
(Continued)

FOREIGN PATENT DOCUMENTS

CN    101362256 A    2/2009
CN    102015193 A    4/2011
(Continued)

OTHER PUBLICATIONS

International Search Report /Written Opinion dated Jun. 16, 2015 for PCT Application No. PCT/EP2015/060178 (8 pages).
(Continued)

*Primary Examiner* — Christopher S Kim
(74) *Attorney, Agent, or Firm* — Squire Patton Boggs (US) LLP (57) ABSTRACT

Methods for joining a first blank and a second blank, wherein the first blank and the second blank include a steel substrate with a coating including a layer of aluminum or an aluminum alloy. The method includes selecting a first portion of the first blank to be joined to the second blank, and selecting a second portion of the second blank to be joined to the first portion, and welding the first portion to the second portion. The welding includes using a laser beam and an arc welding torch, wherein the arc welding torch includes a wire electrode, wherein the wire electrode is made of a steel alloy including gammagenic elements, optionally a stainless steel alloy including gammagenic elements and displacing both the laser beam and the arc welding torch in a welding (Continued)

direction, and wherein in the welding direction, the arc welding torch is positioned in front of the laser beam.

8 Claims, 4 Drawing Sheets

(51) Int. Cl.
| | | |
|---|---|---|
| *B23K 9/173* | (2006.01) | |
| *B23K 10/02* | (2006.01) | |
| *B23K 35/30* | (2006.01) | |
| *B23K 28/02* | (2014.01) | |
| *B23K 101/18* | (2006.01) | |
| *B23K 103/20* | (2006.01) | |

(52) U.S. Cl.
CPC .......... *B23K 28/02* (2013.01); *B23K 35/3053* (2013.01); *B23K 2101/18* (2018.08); *B23K 2103/20* (2018.08)

(58) Field of Classification Search
CPC ............ B23K 35/3053; B23K 2103/20; B23K 2101/18
See application file for complete search history.

(56) References Cited

U.S. PATENT DOCUMENTS

| | | | |
|---|---|---|---|
| 5,283,415 | A | 2/1994 | Nishi et al. |
| 5,304,777 | A | 4/1994 | Pons et al. |
| 5,591,360 | A | 1/1997 | Mombo-Caristan |
| 5,724,712 | A | 3/1998 | Bishop |
| 5,828,032 | A | 10/1998 | Krzys et al. |
| 6,114,656 | A | 9/2000 | Fairchild |
| 6,589,671 | B1 | 7/2003 | Kehrer |
| 6,770,840 | B2 | 8/2004 | Minamida et al. |
| 7,863,538 | B2 * | 1/2011 | Barhorst ................ B23K 9/173 219/74 |
| 8,471,173 | B2 | 6/2013 | Miessbacher et al. |
| 8,499,462 | B2 * | 8/2013 | Masek ................. C22C 38/04 30/346.54 |
| 8,555,507 | B2 | 10/2013 | Lee et al. |
| 8,604,382 | B2 | 12/2013 | Yano et al. |
| 8,748,778 | B2 | 6/2014 | Kodama et al. |
| 8,758,901 | B2 | 6/2014 | Nakamura et al. |
| 9,085,041 | B2 | 7/2015 | Peters et al. |
| 9,186,754 | B2 | 11/2015 | Matsumoto et al. |
| 9,205,512 | B2 | 12/2015 | Gu et al. |
| 9,321,132 | B2 * | 4/2016 | Briand ............... B23K 35/0261 |
| 9,381,720 | B2 | 7/2016 | Kwon et al. |
| 9,457,416 | B2 | 10/2016 | Suzuki et al. |
| 9,597,988 | B2 | 3/2017 | Sakkinen et al. |
| 9,604,311 | B2 | 3/2017 | Evangelista et al. |
| 9,616,527 | B2 | 4/2017 | Briand et al. |
| 9,623,515 | B2 | 4/2017 | Breuer et al. |
| 9,682,446 | B2 | 6/2017 | Katoh et al. |
| 9,833,863 | B2 | 12/2017 | Flugge et al. |
| 2002/0017509 | A1 | 2/2002 | Ishide et al. |
| 2003/0121895 | A1 | 7/2003 | Sonoda et al. |
| 2005/0028897 | A1 | 2/2005 | Kurz |
| 2008/0011720 | A1 | 1/2008 | Briand et al. |
| 2008/0128053 | A1 | 6/2008 | Jansen et al. |
| 2008/0257870 | A1 | 10/2008 | Longfield et al. |
| 2008/0302450 | A1 | 12/2008 | Kaplan |
| 2010/0078412 | A1 * | 4/2010 | Diez ................... B23K 26/348 219/121.64 |
| 2012/0261389 | A1 | 10/2012 | Lin et al. |
| 2013/0043219 | A1 | 2/2013 | Peters et al. |
| 2013/0078031 | A1 | 3/2013 | Nakamura et al. |
| 2013/0098878 | A1 | 4/2013 | Briand et al. |
| 2013/0112663 | A1 | 5/2013 | Bertin et al. |
| 2013/0236239 | A1 | 9/2013 | Brandt et al. |
| 2014/0003860 | A1 | 1/2014 | Evangelista et al. |
| 2014/0027414 | A1 | 1/2014 | Lin et al. |
| 2014/0231395 | A1 | 8/2014 | Brandt et al. |
| 2015/0306702 | A1 | 10/2015 | Breuer et al. |
| 2016/0010174 | A1 | 1/2016 | Canourgues et al. |
| 2017/0173734 | A1 * | 6/2017 | Evangelista ........... B23K 9/235 |
| 2017/0304952 | A1 | 10/2017 | Cretteur et al. |
| 2018/0236600 | A1 | 8/2018 | Vila I Ferrer et al. |

FOREIGN PATENT DOCUMENTS

| | | |
|---|---|---|
| CN | 102728960 A | 10/2012 |
| CN | 102985216 A | 3/2013 |
| CN | 103252589 A | 8/2013 |
| DE | 202007018832 U1 | 9/2009 |
| EP | 1179382 A2 | 2/2002 |
| EP | 2 511 041 A1 | 10/2012 |
| EP | 2567776 A1 | 3/2013 |
| JP | H03110097 A | 5/1991 |
| JP | H06328280 A | 11/1994 |
| JP | H07132389 A | 5/1995 |
| JP | H09285889 A | 11/1997 |
| JP | H11147191 A | 6/1999 |
| JP | 2000117470 A | 4/2000 |
| JP | 2010167435 A | 8/2010 |
| JP | 5248347 B2 | 7/2013 |
| JP | 2013533807 A | 8/2013 |
| KR | 10-2011-0020847 A | 3/2011 |
| WO | WO 2012/007664 A1 | 1/2012 |
| WO | WO 2011/037272 A1 | 2/2013 |
| WO | WO 2013/045497 A1 | 4/2013 |
| WO | WO 2015/086781 A1 | 6/2015 |

OTHER PUBLICATIONS

Extended European Search Report dated Aug. 29, 2014 for European Patent Application No. 14167675.9 (3 pages).
International Search Report dated Apr. 13, 2015 for PCT/EP2014/077463, 9 pages.
Handbook of Designation and Trade name of Worldwide Irons and Steels, "Steel Welding Materials", compiled by Writing Group of "Handbook of Designation and Trade name of Worldwide Irons and Steels", $1^{st}$ Edition printed Oct. 2010, China Machine Press (with English translation).
Wang, Lingyun, et al., "Practical Metal Plastic Forming Physical Metallurty", Scientific and Technical Documents Publishing House, Chongqing Brach, Dec. 1990 (with English translation).
Chinese Patent Application No. 2015800240031, Translation of First Examination Report dated Apr. 27, 2018, 3 pages.
Chinese Patent Application No. 2015800240031, Translation of Second Examination Report dated Dec. 14, 2018, 3 pages.
Effect of Heat Source Location on Weld Formation in Laser-Arc Hybrid Welding, Gao Ming et al., "China Laser", Supplement, pp. 279-283, Apr. 2007, (English abstract) (cited article in an office action dated Dec. 14, 2018 for the Chinese application No. 2015800240031).
The Eleventh National Welding Conference Papers Collection, Welding Society of China Mechanical Engineering Society, pp. 603-606, Heilongjiang Geological Surveying and Mapping Printing Center Printing Factory, May 2005 (cited article in an office action dated Dec. 14, 2018 for the Chinese application No. 2015800240031).
The Effect of Laser and Arc Position on Weld Formation in Laser-MIG Hybrid Welding, Gao Zhiguo, Huang Jian, "Journal of Welding", No. 12, pp. 69-73, Dec. 2008 (cited article in an office action dated Dec. 14, 2018 for the Chinese application No. 2015800240031).

* cited by examiner

METHODS FOR JOINING TWO BLANKS

CROSS-REFERENCE TO RELATED APPLICATIONS

This application is a 35 U.S.C. § 371 national stage entry of International Patent Application PCT/EP2015/060178, filed on May 8, 2015 (published as WO 2015/169946 A1 on Nov. 12, 2015), which claims priority to and claims the benefit of European Patent Application EP14167675.9 filed on May 9, 2014.

TECHNICAL FIELD

The present disclosure relates to methods for joining two blanks, and methods for obtaining products after joining two blanks.

BACKGROUND

The development of new materials and processes for the production of metal pieces with the aim of reducing component weight at a low cost, which is of utmost importance in the automotive industry. In order to achieve these objectives, the industry has developed ultra-high-strength steels (UHSS) which exhibit an optimized maximal strength per weight unit and advantageous formability properties. These steels are designed to attain a microstructure after heat treatment, which confers good mechanical properties and makes them especially suited for the hot stamping process used to form steel blanks into particular automobile parts. Since during the hot stamping process the blank is subjected to aggressive atmospheres, the steel is usually coated to avoid corrosion and oxidation.

In an attempt to minimize the weight of components while respecting structural requirements, so-called "tailored blank" techniques may be used. In these techniques, components may be made of a composite metal blank, which is obtained by welding several blanks with optionally different thicknesses, different materials, size and properties. At least theoretically, using this kind of technique the use of material may be optimized. Blanks of different thickness may be joined or a steel blank, may be joined with a coated steel blank for example, using the specific properties of each material where they are needed.

These blanks may be welded "edge to edge" ("butt-joining"). These so-called tailored blanks are designed to be hot stamped and afterwards be manufactured to form automotive parts. Tailored welded blanks may be used for structural components such as doors, B-Pillars, beams, floor, bumpers, etc.

Similarly, "patchwork" blanks are known, in which several blanks are not necessarily welded "edge-to-edge", but instead partial or complete overlaps of blanks may be used. An example of steel used in the automotive industry is 22MnB5 steel. In order to avoid the decarburization and the oxide scale formation during the heating and forming process, 22MnB5 is presented with an aluminum-silicon coating. Usibor® 1500P and Ductibor® 500P, commercially available from Arcelor Mittal, are examples of steels used in tailored and patchwork blanks.

Patchwork blanks and tailored blanks may also be used or useful in other industries.

Usibor® 1500P is supplied in a ferritic-perlitic condition. The mechanical properties are related to this structure. After heating, hot stamping, and subsequent rapid cooling (quenching), a martensitic microstructure is obtained. As a result, maximal strength and yield strength increase noticeably.

The composition of Usibor® 1500P is summarized below in weight percentages (rest is iron (Fe) and unavoidable impurities):

| C | Si | Mn | P | S | Cr | Ti | B | N |
|---|---|---|---|---|---|---|---|---|
| 0.24 | 0.27 | 1.14 | 0.015 | 0.001 | 0.17 | 0.036 | 0.003 | 0.004 |

As mentioned before, Usibor 1500P is supplied with an aluminum-silicon (AlSi) coating in order to prevent corrosion and oxidation damage. However, this coating has a significant effect related to its weld behavior. If Usibor 1500P blanks are welded without any further measures, aluminum of the coating may enter into the weld area and this can cause an important reduction of the mechanical properties of the resulting component and increase the possibility of fracture in the weld zone.

In order to overcome this problem a method was proposed in DE202007018832 U1 which consists in removing (e.g. by laser ablation) a part of the coating in an area close to the welding gap. This method has the disadvantage that an additional step is needed for the production of the (tailored) blanks and components and that in spite of the repetitive nature of the process this additional step requires a complex quality process with an elevated number of parts which are to be scrapped. This entails an increase of the cost of the welding step and limits the competitiveness of the technology in the industry. US20080011720 proposes a process for laser welding at least one metal workpiece by a laser beam, said workpiece having a surface containing aluminum, characterized in that the laser beam is combined with at least one electric arc so as to melt the metal and weld said workpiece (s). The laser in front of the arc allows the use of a flux-cored wire or the like containing elements inducing the gamma-phase (Mn, Ni, Cu, etc,) favorable to maintaining an austenitic structure throughout the melted zone.

US2014027414 discloses a hybrid welding system including a hybrid welding apparatus and methods of welding. The hybrid welding apparatus includes a laser, an electric arc welder with a non-consumable electrode and a wire feeding device. The electric arc welder provides an electric arc without feeding a welding wire. The wire feeding device is arranged and disposed to feed a wire to a treatment area, which is located between the projections of laser beam and the electric arc. The laser and the electric arc welder are arranged and disposed to direct energy toward at least two adjacent components to form a common molten pool.

US2013043219 discloses a method and a system to weld or join workpieces employing a high intensity energy source to create a weld puddle and at least one resistive filler wire which is heated to at or near its melting temperature and deposited into the weld puddle.

EP2511041 discloses a hybrid welding apparatus including a system and method for welding at least two adjacent components having a large gap of approximately 3.0 millimeters that results in a full-penetration weld. The welding system includes a hybrid welder having a defocused laser beam, an electric arc welder, and at least one bridge piece adjacent to one or more of the at least two adjacent components. The defocused laser beam and the electric arc welder are arranged and disposed to direct energy onto the at least two adjacent components to create a common molten pool operable to provide a full penetration weld to bridge the gap at a high constant weld speed, thereby joining the two adjacent components with a weld.

However, problems related to the only partial dilution of the filler materials along the depth of the welding zone have been found which result in a reduced welding strength.

Herein a blank may be regarded as an article which has yet to undergo one or more processing steps (e.g. deformation, machining, surface treatment or other). These articles may be substantially flat plates or have more complicated shapes.

In examples of the welding methods described herein the aforementioned disadvantages are avoided or at least partially reduced.

SUMMARY

In a first aspect, the invention provides a method for joining a first blank and a second blank, wherein the first blank and the second blank comprises a steel substrate with a coating comprising a layer of aluminum or an aluminum alloy. The method comprises selecting a first portion of the first blank to be joined to the second blank, and selecting a second portion of the second blank to be joined to the first section; and welding the first portion to the second portion. The welding comprises a laser beam and an arc welding torch, wherein the arc welding torch comprises a wire electrode, wherein the wire electrode is made of a steel alloy comprising gammagenic elements, optionally a stainless steel alloy comprising gammagenic elements and wherein in the welding direction, the arc welding torch is in front of the laser beam.

According to this aspect, welding combines a laser beam and an arc welding torch. Combining these two types of welding sometimes is called "hybrid laser welding". The laser beam and the arc welding torch act together in the weld zone, influencing and supporting each other. Combining the laser and the arc, both weld penetration depth and welding speed may be increased, as compared to the laser welding and to the arc welding separately. A high quality and a cost efficient welding may be obtained using a hybrid laser welding.

The power of the laser and/or the arc (or in combination with the arc) should be enough to melt the first and second portions of the blanks. Preferably, the first and second portions of the blanks are melted along the entire thickness of the blanks such that the filler material may be present throughout the entire thickness as well. The resulting microstructure of the final work product may thus be improved.

Without wishing to be bound to any theory, it is believed that the improved weld characteristics are due to the melting of the electrode material of the leading arc welding torch. The electrode material is subsequently mixed throughout the entire weld zone due to the laser beam that follows the arch welding torch. The laser beam creates a sort of keyhole which enables the mixture of the molten material throughout the entire weld zone.

Aluminum may be present in the weld zone, but it does not lead to worse mechanical properties after hot deformation processes such as hot stamping. Since the electrode wire comprises gammagenic elements, which stabilizes the austenitic phase. These gammagenic elements are introduced in the weld zone and mixed with the melt, and as a consequence austenite (gamma phase iron, γ-Fe) may be obtained by heating. During rapid cooling (quenching) after a hot deformation, a martensitic microstructure which gives satisfactory mechanical characteristics may thus be obtained There is thus no need to remove an aluminum or aluminum alloy layer, such as was proposed in some prior art methods. When e.g. coated steel blanks are to be welded, this may be done quicker and cheaper since an intermediate process step is not necessary anymore.

Gammagenic elements are herein to be understood as chemical elements promoting the gamma-phase, i.e. the austenite phase. The gammagenic elements (or "austenitic stabilizer elements") may be selected from a group comprising Nickel (Ni), Carbon (C), Manganese (Mn), Copper (Cu) and Nitrogen (N). Although the addition of "ferrite stabilizer elements" may counteract the action of "austenitic stabilizer elements", optionally these "ferrite stabilizer elements" can still be suitable components when other factors are also taken into account for the composition of the filler. For example, for promoting hardness Molybdenum (Mo) could be a suitable element and e.g. for corrosion resistance Silicon (Si) and Chromium (Cr) could be suitable components.

Aluminum alloys are herein to be understood as metal alloys in which aluminum is the predominant element.

Preferably, the amount of gammagenic elements in the electrode wire or filler wire is sufficient to compensate for the presence of alphagenic elements such as Cr, Mo, Si, Al and Ti (Titanium). Alphagenic elements promote the formation of alpha-iron (ferrite). This may lead to reduced mechanical properties as the microstructure resulting after hot stamping and quenching may comprise martensite-bainite and ferrite.

In some examples, a MAG (Metal Active Gas) welding arc may be used. Alternatively, other welding arcs may be used such as MIG (Metal Inert Gas), TIG (Tungsten Inert Gas) or plasma arc.

Different lasers may be used for laser welding such as Nd-YAG (Neodymium-doped yttrium aluminum garnet) and a CO2 laser with sufficient power. Nd-YAG lasers are commercially available, and constitute a proven technology. This type of laser may also have sufficient power to melt the portions (together with the arc) of the blanks and allows varying the width of the focal point of the laser and thus of the weld zone. Reducing the size of the "spot" increases the energy density.

A shielding gas may be fed towards the weld zone, shielding the welding from the contaminants in the air. In some examples, helium or a helium based gas may be used as a shielding gas. Alternatively an argon based gas may be used.

Different filler wires (or wire electrodes) may be used, dependent on the arc welding torch used. In a hybrid laser welding method, using a MAG welding arc, carbon steel fillers and fillers containing austenite stabilizing elements "gammagenic elements" may be used.

Austenitic stabilizing elements counteract the ferrite stabilizing effect of Al, thus minimizing (or avoiding) ferrite in the final weld joint.

In other embodiments, the filler may contain an austenite stabilizing element and may have a composition in weight percentages of 0%-0.3% of carbon, 0%-1.3% of silicon, 0.5%-7% of manganese, 5%-22% of chromium, 6%-20% of nickel, 0%-0.4% of molybdenum, 0%-0.7% of Niobium, and the rest iron and unavoidable impurities.

The inventors have found that a filler of these mixtures leads to very satisfactory mechanical properties of the final work product, i.e. after hot stamping and quenching.

The various methods hereinbefore described may be used for forming e.g. tailored blanks, by butt joining two blanks. One of the blanks or both blanks may comprise a steel substrate with a coating comprising a layer of aluminum or an aluminum alloy. In particular an AlSi coating may be used; examples include the use of Usibor.

In a second aspect, the present disclosure provides a method for forming a product comprising forming a blank including a method of joining a first and a second blank in accordance with any of the herein described welding methods and subsequently heating the blank, and hot deforming of the heated blank and final quenching. Heating may include heat treatment in a furnace prior to deformation. Hot deforming may include e.g. hot stamping or deep drawing.

BRIEF DESCRIPTION OF THE DRAWINGS

Non-limiting examples of the present disclosure will be described in the following, with reference to the appended drawings, in which.

DETAILED DESCRIPTION OF EXAMPLES

Figure 1A:
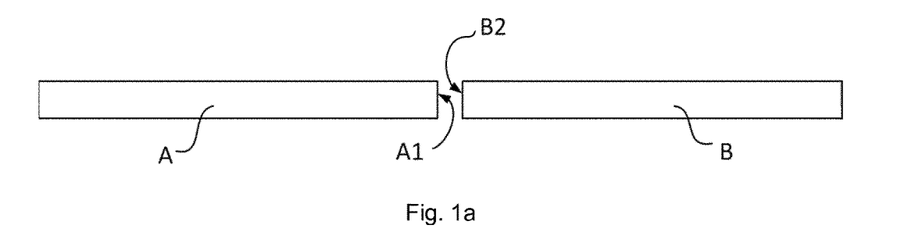
FIGS. 1a and 1b schematically illustrate a first example of joining two blanks.
Figure 1B:
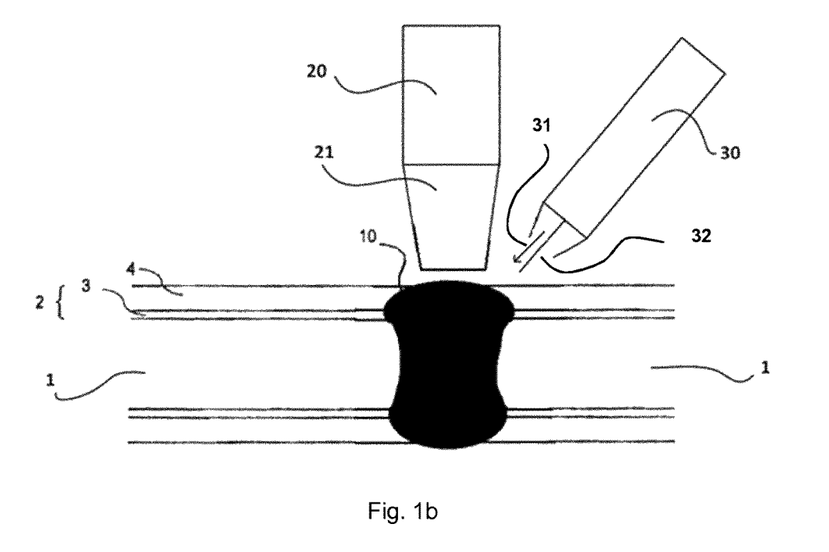

FIGS. 1a and 1b schematically illustrate a first example of a method of joining a first blank A with a second blank B. A first portion or region A1 of the first blank is to be joined to a second portion or region B2 of the second blank. In this example, the two blanks are to be butt-joined, i.e. an edge-to-edge welding.

In this example, both blanks A and B may be of coated steel, such as e.g. Usibor 1500P®. Both blanks comprise a steel substrate 1 upon which a coating 2 is provided. The coating applied is aluminum-silicon (Al87Si10Fe3). Due to the process of application of the coating, the resulting coating has a metal alloy layer 4 and an intermetallic layer 3.

FIG. 1b further illustrates the method of joining according to an example of hybrid laser welding. Schematically illustrated is a laser welder 20 having a laser head 21 from which the laser beam exits. Also schematically illustrated is an arc welding torch 30. An arc welding torch may comprise an electrode wire 32 and a shielding gas may exit the nozzle 31 as schematically illustrated by an arrow.

In the hybrid process, the arc welding torch and laser beam collaborate to form a weld. In the arc welding torch, an electric arc may thus be created between an electrode wire and the portions. This arc melts the electrode wire as well as portions of the blanks. As the electrode wire, sometimes also called a "filler wire", melts, any gap between the blanks may be filled and a weld may be created. On the other hand, the laser beam is focused to create a spot with a high energy density. When the laser beam hits the first and the second portion this spot may be heated up to vaporization temperature, creating a vapor cavity in the portions to be welded due to the escaping metal vapor. Such a vapor cavity may be called a keyhole, and may enable a deep welding effect along the entire thickness of portions to be welded.

It may be seen that in this case, there is no need for removing the coating of the steel substrates prior to welding, thus simplifying and speeding up manufacture. This may bring about a substantial cost reduction. At the same time, an electrode wire or filler wire of suitable composition may ensure that good mechanical properties are obtained after the standard heat treatment for Usibor and after hot deformation processes such as hot stamping.

A standard treatment for Usibor blanks would be to heat the obtained blank in e.g. a furnace to bring about (among others) austenization of the base steel. Then the blank may be hot stamped to form e.g. a bumper beam or a pillar. During rapid cooling after a hot deformation, martensite, which gives satisfactory mechanical characteristics, may thus be obtained. The standard treatment is not affected in any manner by the methods of joining proposed herein. In particular, thanks to the elements of the electrode wire that are supplied into the weld zone, a martensite structure can also be obtained in the area of the weld, in spite of the presence of aluminum.

Figure 2A:
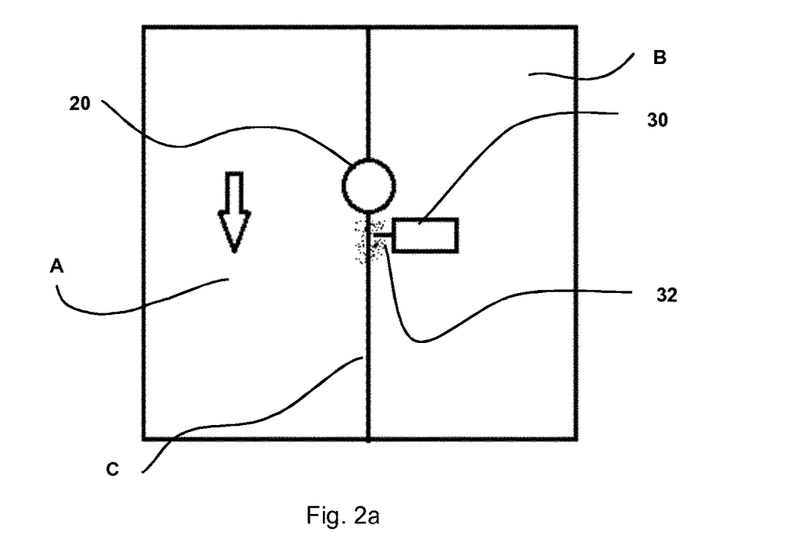
FIGS. 2a-2b schematically illustrate an example arrangement for a laser beam and an arc welding torch according to one implementation.

FIG. 2a schematically illustrates a first blank A is to be joined to a second blank B along a weld seam C, wherein the arc welding torch 30 is positioned in front of the laser beam 20 according to the welding direction.

Figure 2B:
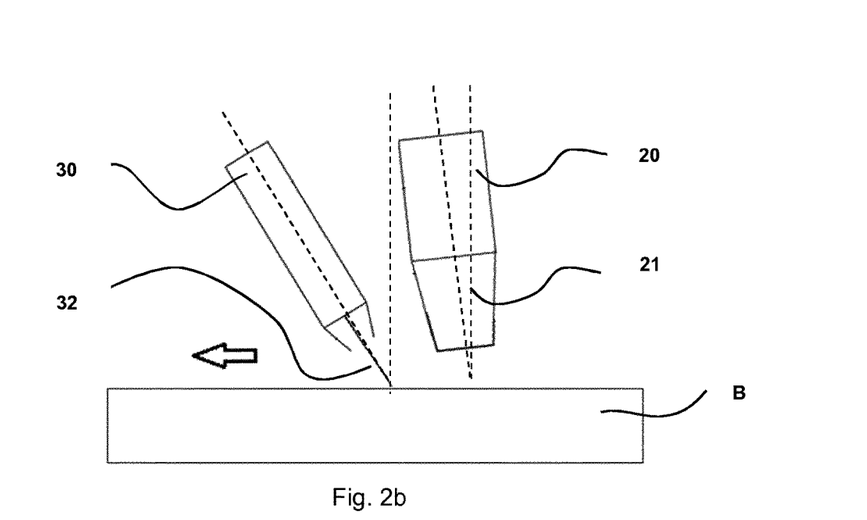

FIG. 2b schematically illustrates a lateral view of the FIG. 2a. The welding torch 30 may have an angle between 10° and 35°, optionally between 14° and 30°, while the laser beam 20 may have an angle between 0° and 15°, optionally between 4° and 10°, in relation with a plane perpendicular to the first portion.

In all the examples illustrated herein so far, blanks in the shape of flat plates are joined together. It should be clear that examples of the methods herein disclosed may also be applied to blanks of different shapes.

After initial testing for proof-of-concept of hybrid welding the blanks, extensive testing was performed by the inventors to optimize the welding process with respect to filler materials, position of the welding arch and the laser beam in relation with the welding direction, wire feed rating, welding speed and laser power.

In these tests, two flat Usibor 1500 ® plates of 1.4 mm thickness were butt-joined and results were compared to two flat 22MnB5 uncoated boron steel plates.

Both hybrid laser welding topologies, the welding arch positioned in front of the laser beam and the laser beam positioned in front of the welding arch in relation with the welding direction, were tested.

Four different fillers were tested, two of them carbon steel filler and two of them austenite stabilizing fillers comprising gammagenic elements. The characteristics and composition of these fillers are summarized below in weight percentages (rest is iron (Fe) and unavoidable impurities):

TABLE 1

| Characteristics and compositions of fillers | | | | |
|---|---|---|---|---|
| Filler Sample | A | B | C | D |
| Filler Type | Carbon steel | Carbon steel | Austenite stabilizing stainless steel | Austenite stabilizing stainless steel |
| Tensile Strength [Mpa] | 560 | 800 | 640 | 640 |
| Yield Strength [Mpa] | 470 | 730 | 450 | 440 |
| Elongation at break | 26% | 19% | 41% | 37% |
| Diameter (mm) | 0.9 | 0.8 | 0.8 | 0.8 |
| C | 0.1 | <0.1 | <0.2 | 0.04 |
| Si | 0.9 | 0.6 | <1.2 | 0.7 |

TABLE 1-continued

Characteristics and compositions of fillers

| Filler Sample | A | B | C | D |
|---|---|---|---|---|
| Mn | 1.5 | 1.6 | 6.5 | 0.7 |
| Cr |  | 0.3 | 18.5 | 19 |
| Ni |  | 1.4 | 8.5 | 10 |
| Mo |  | 0.3 |  | 0.3 |
| Cu |  | <0.4 |  |  |
| Nb |  |  |  | 0.6 |

It was found that using an austenite stabilizing stainless steel filler, as in the filler samples C and D, the formation of ferrite may be avoided, because martensite is formed instead of ferrite. Thus, a good weld joint strength can be obtained.

Figure 3A:
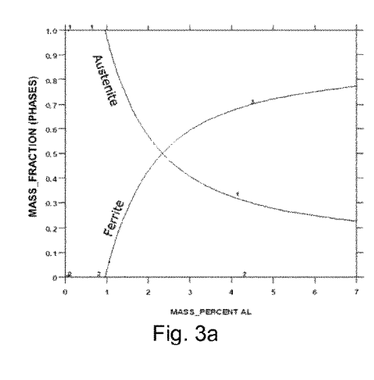
FIGS. 3a and 3b schematically illustrate the effect of a filler material on a resulting microstructure after welding.

FIG. 3a represents the portion of Austenite and Ferrite phases in a 22MnB5 uncoated boron steel blank in relation with the Aluminum content at a temperature of 920° C. The percentage of ferrite and austenite formation depends on the amount of Aluminum. The ferrite phase first occurs with Aluminum content in mass of at least 1%.

Figure 3B:
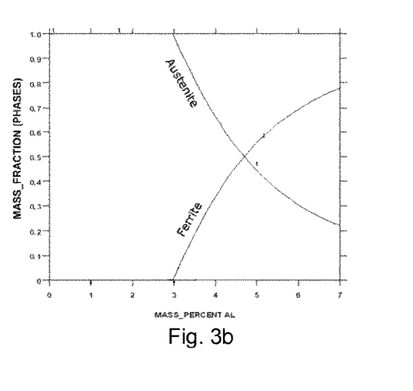

FIG. 3b represents the portion of Austenite and Ferrite phases in relation with the Aluminum content of a mixture (50/50) of 22MnB5 and the austenite stabilizing stainless steel filler OK Autorod 16.95 (commercially available from ESAB®) at a temperature of 920° C. The composition in weight percentages of OK Autorod 16.95 is: 0.08% C, 0.9% Si, 7% Mn, 18.7% Cr, 8.1% Ni, 0.2% Mo, 0.1% Cu, 0.04% N and the rest Fe and unavoidable impurities. A ferrite phase now only occurs with Aluminum content in mass of at least 3%. Thus, adding these austenite stabilizing stainless filler materials increases the mass content of Aluminum necessary for establishing a ferrite phase. In other words, thanks to the filler, more aluminum can be allowed in the weld area while still maintaining mechanical properties, i.e. while still ensuring the presence of austenite.

Figure 4A:
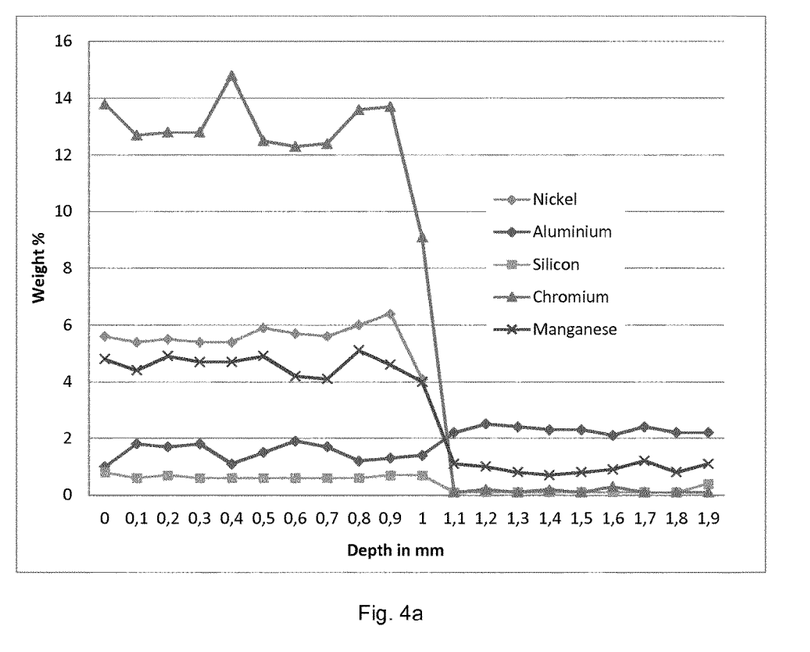
FIGS. 4a and 4b illustrate the distribution of filler material throughout a weld depending on the relative positions of a laser beam and an arc welding torch.
Figure 4B:
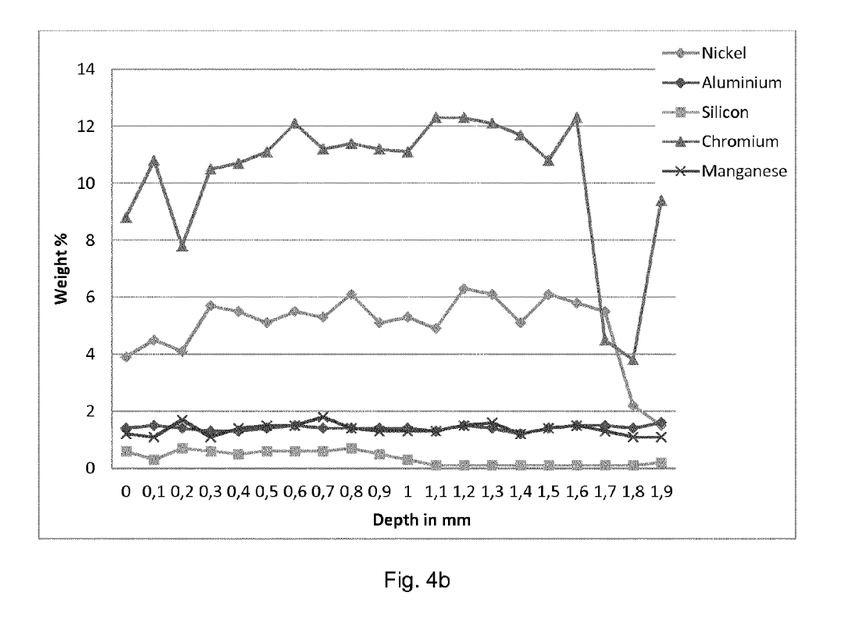

FIGS. 4a and 4b show the distribution and the content of Nickel, Aluminum, Silicon, Chromium and Manganese in a welding line of two flat Usibor 1500 ® plates of 1.4 mm thickness. In both examples, austenite stabilizing stainless fillers were used. The horizontal axis shows the depth of the welding line in millimeters, wherein 0 corresponds to the top surface of the welding line and 1.9 millimeters to the bottom surface of the welding line. The vertical axis shows the content in weight percentages of the elements in the center of the weld.

In particular, FIG. 4a shows the distribution and content of the above mentioned elements along the depth of the welding line of the two flat plates, in the case of hybrid laser welding with a laser beam and an arc welding torch, positioned in such way that the laser beam is in front of the arc welding torch. In this example, an austenite stabilizing stainless filler was used, in particular a C sample (see Table 1) austenite stabilizing stainless filler.

In particular, FIG. 4b shows the distribution and content of the above mentioned elements along the depth of the welding line of the two flat plates, in the case of hybrid laser welding with a laser beam and an arc welding torch, positioned in such way that the arc welding torch is in front of the laser beam. In this example, an austenite stabilizing stainless filler was used, in particular a D (see Table 1) sample austenite stabilizing stainless filler.

After several tests, in which different fillers were used with the hybrid laser welding with both the laser beam in front of the arch welding torch and the arch welding torch in front of the laser beam, the inventors have found out that the aluminum content and distribution along the welding depth differs when the laser beam is positioned in front of the arch welding torch, compared with the arch welding torch being positioned in front of the laser beam.

When the laser beam is positioned in front of the arc welding torch in the welding direction, the austenite stabilizing stainless filler does not reach the bottom part of the weld. The Aluminum may lead to worse mechanical properties in the welding zone after hot deformation processes such as hot stamping, because of ferrite formation instead of austenite formation.

When the arc welding torch is positioned in front of the laser beam in the welding direction, the austenite stabilizing elements in the filler reaches the bottom part of the weld. Therefore, the Aluminum does not lead to worse mechanical properties in the welding zone after hot deformation processes such as hot stamping. This better distribution of the austenite stabilizing elements is achieved by using a hybrid laser welding wherein the arc welding torch is positioned in front of the laser beam in the welding direction, wherein carbon steel fillers or austenite stabilizing fillers are used. Using austenite stabilizing fillers increases the mass content of Aluminum when the ferrite phase starts as shown in the FIG. 3b. Thus, the influence of the aluminum in the welding area is minimized and a weld joint with good mechanical properties is obtained.

It has also been found that using a hybrid laser welding with the arch welding torch positioned in front of the laser beam increases the welding quality when there is a gap between the two blanks to be welded. Due to a full penetration due to the positioning of the welding torch in front of the laser beam, a gap of up to about 0.7 mm between the two blanks may be welded. On the other hand, when the laser beam is positioned in front of the arch welding torch, the maximum gap between blanks is about 0.2 mm. Providing the arc welding torch in front of the lase beam increases the manufacturability of the welding and may reduce the manufacturing tolerances of the blanks.

Several strength tests have been performed, comparing the welding strength of two flat 22MnB5 uncoated boron steel plates and two flat Usibor 1500P® plates of 1.4 mm thickness were butt-jointed. The influence of the fillers and the hybrid laser configuration has also been tested. The following table summarizes the results of these tests.

TABLE 2

Test results, tensile strength

| Material | Welding Configuration | Electrode wire fillers | Average Tensile Strength [Mpa] |
|---|---|---|---|
| 22MnB5 uncoated boron | Pure laser welding | — | 1498 |
|  | Laser hybrid welding: Laser beam in front of the welding arch torch | Carbon steel filler | 1424 |
|  | Laser hybrid welding: Welding arch torch in front of the laser beam | Austenite stabilizing fillers | 1527 |
| Usibor 1500P ® | Pure laser welding | — | 1130 |
|  | Laser hybrid welding: Laser beam in front of the welding arch torch | Carbon steel filler | 1074 |
|  |  | Austenite stabilizing fillers | 1166 |
|  | Laser hybrid welding: Welding arch torch in front of the laser beam | Carbon steel filler | 1210 |
|  |  | Austenite stabilizing fillers | 1409 |

Good mechanical properties are obtained, where two Usibor 1500P® blanks were welded by laser hybrid welding with the welding arc torch positioned in front of the laser beam according to the welding direction. Particularly, a high tensile strength is obtained when fillers containing austenite stabilizing materials are used. The tensile strength obtained could be compared with an unwelded Usibor products and a welded 22MnB5 uncoated boron products.

These good mechanical properties may be obtained using a relatively high welding speed, improving the manufacturing processes and reducing the welding time. Welding speeds from 5-12 m/min may be achieved in the various examples.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A method for joining a first blank and a second blank, the method comprising:
   selecting a first portion of the first blank to be joined to the second blank, and selecting a second portion of the second blank to be joined to the first portion,
   wherein the first blank and the second blank comprise a steel substrate with a coating comprising a layer of aluminum or an aluminum alloy,
   welding the first portion to the second portion with a laser beam and an arc welding torch, wherein
   the arc welding torch comprises a filler wire electrode, and
   the filler wire electrode is made of a stainless steel alloy comprising iron, and also comprises, in weight percentages, 0%-0.3% of carbon, 0%-1.3% of silicon, 0.5%-7% of manganese, 5%-22% of chromium, 6%-20% of nickel, 0%-0.4% of molybdenum, and 0%-0.7% of niobium, and
   displacing both the laser beam and the arc welding torch in a welding direction, the first portion and the second portion of the blanks in a weld zone being melted during the welding,
   wherein in the welding direction, the arc welding torch is positioned in front of the laser beam.

2. The method according to claim 1, wherein the arc welding torch has an angle of 10°-35° with respect to a plane perpendicular to the first portion.

3. The method according to claim 2, wherein the arc welding torch has an angle of 14°-30° with respect to a plane perpendicular to the first portion.

4. The method according to claim 1, wherein the laser beam has an angle of 0°-15° with respect to a plane perpendicular to the first portion.

5. The method according to claim 4, wherein the laser beam has an angle of 4°-10° with respect to a plane perpendicular to the first portion.

6. The method according to claim 1, wherein the first and second blanks are butt-jointed, the first portion being an edge of the first blank and the second portion being an edge of the second blank.

7. The method according to claim 1, wherein the steel substrate is a boron alloyed hardenable steel.

8. A method for forming a product comprising:
   forming a third blank by joining a first blank and a second blank according to the method of claim 1,
   heating the third blank, and
   hot deforming and quenching the heated third blank.

* * * * *